A. Ingalls.
Tire Upsetting.
Nº 35,097. Patented Apr. 29, 1862.
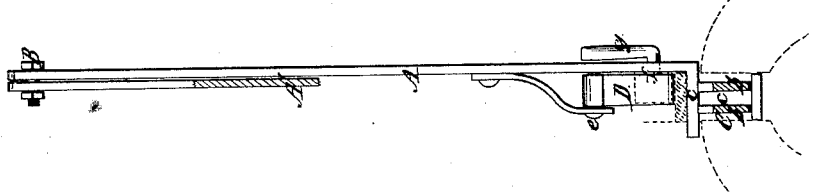
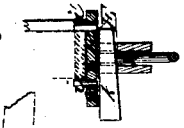
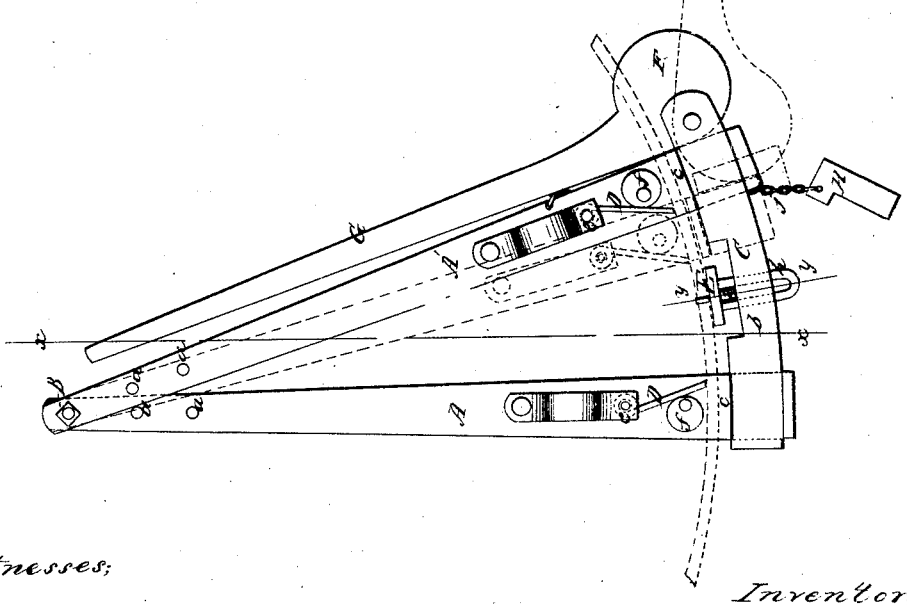
Witnesses:
Inventor:
A. Ingalls,
per Munn & Co.
Attorneys.

UNITED STATES PATENT OFFICE.

ALFRED INGALLS, OF INDEPENDENCE, IOWA.

IMPROVEMENT IN MACHINES FOR UPSETTING TIRES.

Specification forming part of Letters Patent No. 35,097, dated April 29, 1862.

*To all whom it may concern:*

Be it known that I, ALFRED INGALLS, of Independence, in the county of Buchanan and State of Iowa, have invented a new and Improved Implement or Device for Shrinking or Upsetting the Tires of Wheels; and I do hereby declare that the following is a full, clear, and exact description of the same, reference being had to the accompanying drawings, making a part of this specification, in which—

Figure 1 is a front or face view of my invention; Fig. 2, a vertical section of the same, taken in the line $x\ x$, Fig. 1; Fig. 3, a section of the same, taken in the line $y\ y$, Fig. 1.

Similar letters of reference indicate corresponding parts in the several figures.

To enable those skilled in the art to fully understand and construct my invention, I will proceed to describe it.

A A′ represent two metal bars, the upper parts of which are perforated with holes $a$, in any of which a pin, B, may be fitted. The lower end of the bar A is attached permanently to a segment-stock, C, which is formed of two plates, $b\ b$, secured side by side, with a space, $c$, between them, as shown clearly in Figs. 2 and 3. The lower end of the bar A′ is free or disengaged, and is fitted and allowed to work or move freely between the plates $b\ b$.

Each bar A A′ is provided at its lower part with a horizontal plate, $c$, and these plates rest upon the upper concave surface of the stock C, and form bearing-surfaces for the tire while being acted upon. The bars A A′ are also each provided with a jaw, D. These jaws are formed of plates, the upper ends of which are suspended loosely on horizontal pins $e\ e$, and a cam, $f$, is fitted or secured to each bar A A′, said cams being each provided with a handle or lever, $g$, for the purpose of turning them. (See Figs. 1 and 2.) The cams $f$, it will be seen by referring to these figures, are at the outer sides of the jaws D D.

E is a plate, which rests on the upper concave surface of the stock C. This plate is provided with a pendent link or eye, $h$, which passes down between the plates $b\ b$ of the stock C between the bars A A′. The plate E is perforated with holes $h'$, in any of which a pin, $i$, is fitted.

F is a cam or eccentric plate, which is secured between the plates $b\ b$ at one end of the stock C. This cam or eccentric has a lever, G, attached to it, which may be of any suitable length. The cam or eccentric F, it will be seen by referring to Fig. 1, is at the outer side of the movable bar A′.

H is a key, which is attached to the bar A′ by a chain, $j$, and $k$ is a key or wedge, which is inserted in the loop or eye $h$ of the plate E.

The device is used as follows: The stock C is secured between the jaws of an ordinary vise, or it may be permanently attached to a fixed upright or support. The key or wedge $k$ is withdrawn from the loop or eye $h$ of the plate E, and the key H hangs loosely from the bar A′. The tire to be operated upon is heated at the point where it is to be shrunk or upset, and the pin B is passed through a hole, $a$, in the bars A A′, which will be at a point coinciding with the center of the tire; hence the object of having a plurality of holes $a$ is to accommodate the device to tires of different diameters. The tire, when properly heated at the desired point, is placed vertically upon the upper concave side of the stock C, the heated portion being between the jaws D D, the bar A′ being adjusted sufficiently far in an outward direction to admit of such result. The lower ends of the jaws D D are then brought in contact with the inner surface of the tire by turning or adjusting the cams $f\ f$ and the bearing-plate E is forced upward against the outer surface of the tire by driving the key or wedge $k$ into the loop or eye $h$ between the plate E and the stock C. The operator then draws down the lever G and the cam E forces inward or toward the bar A the bar A′, and the two jaws D D clamp the tire and cause it to be upset or contracted, the cams $f$ serving as bearings for the jaws. In case one throw of the lever G is not sufficient to upset or contract the tire as much as desired, the key H is inserted in the stock C between the plates $b\ b$ and between the movable bar and cam and the operation repeated. The plate E serves as a bearing for the outer side of the tire at the heated part, and prevents such part from being forced downward or outward under the pressure to which it is subjected.

This device, it will be seen, is extremely simple, and may be manufactured at a small cost, so as to be within the reach of artisans in a small way of business.

The cams $ff$ form an essential feature of the operation, as they not only serve as rests or bearing for the jaws D D and retain the same in proper position while at work, but they also serve as a means to adjust the jaws in proper position relatively with their work or the tire to be acted upon and to throw them out therefrom to release the tire when the work is completed. This adjustment of the jaws through the medium of the cams also admits of the former being adapted to act upon tires of different thicknesses.

The pin $i$ serves to prevent the lateral bulging out of the heated portion of the tire when under pressure, the inner edge of the tire bearing against a pin, $i'$.

The bearing-plate E is an important feature of the invention, as it, with the adjustable pin B, admits of the device being applicable for operating on tires of different diameters. Were the stock C a fixed bed for the tire to rest upon and the pin B not adjustable, it would be impossible for tires of different diameters to be shrunk in perfect circular form. Devices on the same principle as mine have been constructed with a fixed pin, B, and a curved stock or bed-piece to receive the tire; but they only operate perfectly when a tire is applied to them the radius of which corresponds to the bars A A'. (See patent granted to A. Cassell, October 16, 1860, in which two bars with a fixed pin and a curved stock is used.)

I do not claim, separately, any of the parts herein shown and described, for the bars A A' and jaws D D, or their equivalents, have been used together with the stock C and cam F; but I do claim as new and desire to secure by Letters Patent—

1. The cams $ff$, in combination with the jaws D D, attached to the bars A A', and arranged, in relation with the jaws, to operate as and for the purpose specified.

2. The key H, when used in connection with the bars A A', jaws D D, cams $ff$, stock C, and cam F, as and for the purpose set forth.

ALFRED INGALLS.

Witnesses:
W. CHANDLER,
D. P. DANIEL.